United States Patent [19]

Phillips et al.

[11] 3,957,014

[45] May 18, 1976

[54] THERMOPARTICULATING TAPE

[75] Inventors: David C. Phillips, Pittsburgh; James D. B. Smith, Turtle Creek, both of Pa.

[73] Assignee: Westinghouse Electric Corporation, Pittsburgh, Pa.

[22] Filed: June 19, 1975

[21] Appl. No.: 588,570

[52] U.S. Cl. ............................. 116/114 F; 73/28; 73/356; 116/DIG. 14; 116/114 V
[51] Int. Cl.² ........................................ G01D 13/00
[58] Field of Search ............... 116/DIG. 14, 114 F, 116/101, 114.5, 114 V; 73/368.2, 339 R, 355 R, 362 AR, 421.5, 28, 356

[56] References Cited
UNITED STATES PATENTS

| | | | |
|---|---|---|---|
| 2,442,823 | 7/1948 | Polye | 73/355 R |
| 2,889,799 | 6/1959 | Korpman | 116/DIG. 14 |
| 3,807,218 | 4/1974 | Carson et al. | 73/421.5 |

*Primary Examiner*—Donald O. Woodiel
*Attorney, Agent, or Firm*—R. D. Fuerle

[57] ABSTRACT

A thermoparticulating tape is disclosed which comprises a flexible fibrous material, a compound which thermoparticulates at a temperature below 200°C dispersed throughout the flexible fibrous material, and a flexible outer coating over the flexible fibrous material through which the products formed when the compound thermoparticulates can pass. The tape is best made by dissolving the thermoparticulating compound in a solvent, immersing the fibrous material in the solution, evaporating the solvent, and applying the outer coating to the fibrous material. An adhesive backing can be applied to the tape if desired. The tape is placed in an electrical apparatus cooled by a gas stream, in a position exposed to the gas stream. When overheating occurs the tape darkens and emits particles into the gas stream which are detected by a monitor.

20 Claims, 1 Drawing Figure

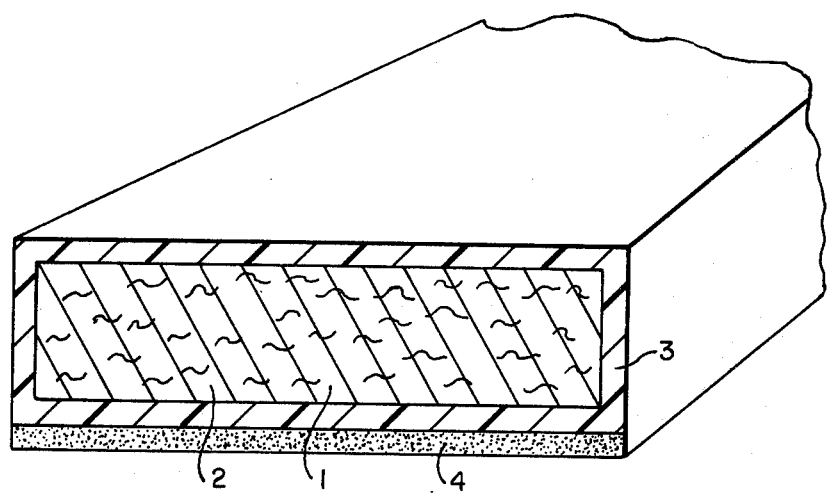

THERMOPARTICULATING TAPE

CROSS-REFERENCES TO RELATED APPLICATIONS

This application is related to application Ser. No. 426,391 filed Dec. 19, 1973 by Emil M. Fort, Thomas D. Kaczmarek, and David Colin Phillips titled "Sampling System For Power Generators."

This application is related to application Ser. No. 568,221, filed Apr. 15, 1975 by J. D. B. Smith and D. C. Phillips titled "Metal Acetyl Acetonate Composition For Forming Thermoparticulating Coating."

This application is related to application Ser. No. 568,219, filed Apr. 15, 1975 by J. D. B. Smith and D. C. Phillips titled "Malonic Acid Derivative Composition For Forming Thermoparticulating Coating."

This application is related to application Ser. No. 568,218, filed Apr. 15, 1975 by D. C. Phillips, W. M. Hickam, and J. D. B. Smith titled "Mutliple Signal Thermoparticulating Coating."

This application is also related to application Ser. No. 390,284 filed Aug. 21, 1973 by J. D. B. Smith and D. C. Phillips titled "Composition For Forming Thermoparticulating Coating Which Protects Electrical Apparatus."

This application is also related to application Ser. No. 568,224, filed Apr. 15, 1975 by J. D. B. Smith and D. C. Phillips titled "Diazonium Salt Composition For Forming Thermoparticulating Coating."

This application is related to application Ser. No. 568,223, filed Apr. 15, 1975 by J. D. B. Smith, D. C. Phillips, and K. W. Grossett titled "Grease Thermoparticulating Coating."

This application is related to application Ser. No. 568,222, filed Apr. 15, 1975 by J. D. B. Smith, J. F. Meier, and D. C. Phillips titled "Blocked Isocyanate Composition For Forming Thermoparticulating Coating."

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

Descriptions of such monitors and how they function may be found in U.S. Pat. No. 3,427,880 titled "Overheating Detector For Gas Cooled Electrical Machine" and in U.S. Pat. No. 3,573,460 titled "Ion Chamber For Submicron Particles." Another monitor, "The Condensation Nuclei Detector," is described by F. W. Van-Luik, Jr. and R. E. Rippere, in an article titled "Condensation Nuclei, A New Technique For Gas Analysis," in Analytical Chemistry 34, 1617 (1962) and by G. F. Skala, in an article titled "A New Instrument For The Continuous Detection of Condensation Nuclei," in Analytical Chemistry 35,702 (1963).

As U.S. Pat. Nos. 3,427,880 and 3,807,218, and the hereinbefore-cited cross-referenced applications disclose, special coatings may be applied to the apparatus which decompose to form detectable particles (i.e., thermoparticulate) at a lower temperature than the usual organic compounds found in the apparatus.

SUMMARY OF THE INVENTION

We have found that thermoparticulating compounds (TPC's) can be contained within a tape of a certain specific structure which protects the TPC's from erosion by the gas stream yet permits the products of the thermoparticulation to escape from the tape during overheating. The use of a tape containing TPC's offers several advantages over applying the TPC's in a resin as described in the cross-referenced related applications.

First, in the tape it is possible to attain higher loadings of the TPC's. More TPC to the cubic inch means that the tape is more sensitive to overheating and that the monitor produces a stronger signal.

While the resin-applied TPC's darken and blister, which is of considerable aid in visually locating the area of overheating, the darkening and blistering which occurs in the tape is more severe and therefore easier to spot.

The tape is easier to apply to the machine than the resin because the resin can drip. The resin also contains a solvent which, although evaporated, can continue to leach out of the resin and add to the background "noise" that the monitor receives and which is trapped in the sample to be analyzed.

Finally, due to its larger loading, it is believed that the tape will age better, i.e., it will continue to thermoparticulate after a longer time at an elevated temperature below the thermoparticulating temperature.

DESCRIPTION OF THE INVENTION

The accompanying drawing is an isometric view in cross-section of a certain presently-preferred embodiment of the tape of this invention.

In the drawing a flexible fibrous material 1 has a thermoparticulating compound 2 dispersed throughout. Covering the fibrous material is a flexible outer coating 3 through which the products of thermoparticulation can pass. An adhesive coating 4 on one side of the tape enables it to adhere to surfaces within the generator.

The fibrous material must be flexible so that the tape can be applied to irregular surfaces. While glass, asbestos, and other fibrous materials can be used, organic fibrous materials such as linen, cotton, polyesters, acrylics, polyamides, etc. are preferred because they are more absorbent. Dacron (polyethylene terephthalate) is particularly preferred as it works very well and is inexpensive, but Nomex (an aromatic polyamide) is preferred when the tape is subjected to aging at higher (80°C) temperatures. The fibrous material is preferably a nonthermoparticulating material (i.e., does not thermally degrade to produce particles detectable by the monitor) so that it does not interfere with the signal produced by the TPC or with the sample taken for analysis. While woven material or mat may be used, mat is preferred as it is more absorbent and therefore permits a greater loading. Generally, the fibrous material will be about ½ to 15 cm. wide and about 1 to 20 mils thick although other sizes may be used if desired.

The thermoparticulating compound is a compound which emits detectable particles when heated to a temperature between 60° and 200°C. The previously cited cross-referenced applications, herein incorporated by reference, may be referred to for examples and additional information about specific TPC's. Briefly, these compounds include diazonium salts, malonic acid and its derivatives, metal acetyl acetonates, blocked isocyanates, and certain greases. The following tables are lists of useful thermoparticulating compounds from those previously cross-referenced applications.

| Metal Acetylacetonate | Days Aged At 60°C | Thermoparticulating Temperature Range (°C) |
|---|---|---|
| $Zn(C_5H_7O_2)_2 \cdot 2H_2O$ | 110 | 95–100 |
| $Al(C_5H_7O_2)_3$ | 44 | 159–161 |
| $Fe(C_5H_7O_2)_3$ | 6 | 171–174 |
| $Mg(C_5H_7O_2)_2 \cdot 2H_2O$ | 6 | 192–195 |
| $Mn(C_5H_7O_2)_3$ | 1 | 132–133 |
| $Mn(C_5H_7O_2)_2$ | 1 | 182–185 |
| $Co(C_5H_7O_2)_2$ | 1 | 128–131 |
| $Co(C_5H_7O_2)_3$ | 1 | 150–152 |
| $Co(C_5H_7O_2)_2 \cdot H_2O$ | 1 | 165–168 |
| $Cr(C_5H_7O_2)_3$ | 1 | 179–183 |
| $Ni(C_5H_7O_2)_2 \cdot 2H_2O$ | 1 | 169–173 |

| Grease | Aging Time at 120°C (days) | | |
|---|---|---|---|
| | 3 | 59 | 84 |
| A mixture of about 20% telomer of polytetrafluoroethylene and about 80% perfluoroalkyl polyether, sold by DuPont under the trademark "Krytox 240-AD" | 194–198°C | 191–198°C | 200–207°C |

The above table gives the thermoparticulation temperature after various periods of aging.

| Diazonium Salt | Literature Decomposition Temperature (°C) | Support Material | Concentration in Epoxy (phr)[b] | Additional Heat Treatment | Thermoparticulation Temperature (°C) |
|---|---|---|---|---|---|
| 3-chloro - 4-diethyl aminobenzene-diazonium chlorozincate | 113 | Dacron felt | 26.2[a] | None | None |
| | | Copper | 20.0 | 20 days at 80°C | 190* |
| p-diethylamino-benzene-diazonium chlorozincate | 117 | Dacron felt | 40.5[a] | None | None |
| | | Copper | 20.0 | 20 days at 80°C | 190* |
| p-diethylamino-benzen-diazonium fluoroborate | 108 | Dacron felt | 30.8[a] | None | 120 |
| | | Copper | 20.0 | 1 day at 80°C | 125 |
| | | Copper | 20.0 | 20 days at 80°C | 190* |
| 2,5-diethoxy-4-morpholinobenzene diazonium chlorozincate | 120 | Copper | 20.0 | 3 days at 80°C (sample decomposed) | — |
| 4-diethylamino-2-methylbenzene- diazonium chlorozincate | 120 | Copper | 20.0 | 3 days at 80°C (sample decomposed) | — |
| 4-diethylamino -2-ethoxybenzene - diazonium chlorozincate | 140 | Copper | 20.0 | 24 days at 80°C | 180 |
| 4-ethylamino -3-methylbenzene - diazonium chlorozincate | 125 | Copper | 20.0 | 2 days at 80°C (sample decomposed) | — |
| p-amino-N-benzyl-N-ethylbenzene - diazonium chlorostannate | 160 | Copper | 20.0 | 24 days at 80°C | 159 |
| p-dimethylamino-benzene - diazonium chlorozincate | 145 | Copper | 20.0 | 2 days at 80°C (sample decomposed) | — |
| p-chlorobenzene-diazonium pentafluorophosphate | 150 | Dacron felt | 63.5 | None | 110 |
| | | Copper | 20.0 | 3 days at 80°C (sample decomposed) | — |

*probably due to decomposition of epoxy resin.
[a]This figure is the weight % on the Dacron felt- no resin was used.
[b]"phr" includes solvent.

BLOCKED ISOCYANATE

| Isocyanate Moiety | Lewis Base Moiety | Melting Point (°C) | Aging Conditions | Thermoparticulation Temperature Range (°C) |
|---|---|---|---|---|
| Hexamethylene Diisocyanate | Dimethylamine | 166–170 | 7 days at 60°C | 166 – 171 |
| Toluene Diisocyanate | Mercaptobenzothiazole | 153–161 | 30 days at 80°C | 166 – 170 |
| | | | 7 days at 60°C | 161 – 165 |
| Toluene Diisocyanate | Diethylamine | 90–95 | 30 days at 80°C | 164 – 165 |
| | | | 7 days at 60°C | 154 – 159 |

-continued

| BLOCKED ISOCYANATE | | | | |
|---|---|---|---|---|
| Diisocyanate | | | 30 days at 80°C | 154 – 157 |
| Phenyl Isocyanate | 1,3-diethylol-5,5-dimethyl hydantoin(1) | Viscous Liquid | 8 days at 60°C | 189 – 195 |
| P,P'-Diphenylmethane Diisocyanate | Nitrosophenol | 179 | 8 days at 60°C | >190°C |
| "Mondur S" (2) | Phenol | 125–130 | 7 days at 60°C | 190 – 196 |
| "Mondur SH" (3) | Phenol | 161–166 | 7 days at 60°C | >190 |
| Hexamethylene Diisocyanate | α-Pyrrolidone | 94–96 | 7 days at 60°C | >190 |
| Hexamethylene Diisocyanate | Phenol | 128–131 | 42 days at 60°C | 179 – 189 |
| Toluene Diisocyanate | Phenol | 153–156 | 42 days at 60°C | 170 – 177 |
| p,p'-Diphenylmethane Diisocyanate | Phenol | 192–194 | 42 days at 60°C | 190 – 194 |
| Phenyl Isocyanate | Phenyl glycidyl ether | | overnight at 60°C | 167 |
| Phenyl Isocyanate | Styrene oxide | | overnight at 60°C | 172 |
| Phenyl Isocyanate | Butyl glycidyl ether | | overnight at 60°C | 172 |
| Hexamethylene Diisocyanate | Thiophenol | | overnight at 60°C | 143 |
| Phenyl Isocyanate | Ethylmethyl ketoxime | | overnight at 60°C | 169 – 173 |
| Phenyl Isocyanate | N(2-hydroxyethyl) piperazine | | overnight at 60°C | 180 – 185 (4) |
| Phenyl Isocyanate | Dicyclopentenyl Alcohol | | overnight at 60°C | 168 |
| Butyl Isocyanate | 4,4'-thiophenol | | overnight at 60°C | 175 |
| Butyl Isocyanate | 4,4'-sulfonyl diphenol | | overnight at 60°C | 181 |

(1) Sold by Glyco Chemicals, Inc. under the trademark "Dantocol DHE"
(2) "Mondur S" is sold by the Mobay Chemical Co. and has the structure

(3) "Mondur SH" is sold by the Mobay Chemical Co. and has the structure

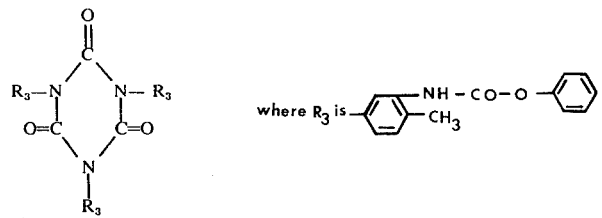

(4) Signal very strong.

| Compound | Chemical Formula | Aging Condition | Thermoparticulating Temperature Range (°C) |
|---|---|---|---|
| Malonic Acid | $CH_2(COOH)_2$ | 140 days at 60°C | 132 – 142 |
| Methylmalonic Acid | $CH_3CH(COOH)_2$ | 140 days at 60°C | 132 – 138 |
| Dimethylmalonic Acid | $(CH_3)_2C(COOH)_2$ | 180 days at 80°C | 152 – 158 |
| Ethylmalonic Acid | $C_2H_5CH(COOH)_2$ | 140 days at 60°C | 119 – 127 |
| Diethylmalonic Acid | $(C_2H_5)_2(COOH)_2$ | 3 days at 80°C | 168 – 180 |
| Di-n-Propylmalonic Acid | $(C_3H_7)_2C(COOH)_2$ | 120 days at 80°C | 155 – 160 |
| Benzylmalonic Acid | $C_6H_5CH_2CH(COOH)_2$ | 50 days at 60°C | 143 – 151 |
| Phenylmalonic Acid | $C_6H_5CH(COOH)_2$ | 1 day at 60°C | 150 – 157 |

The thermoparticulating temperatures given in the above tables are approximate and may vary depending on the resin used, aging time, and other factors. Mixtures of TPC's may also be used.

The TPC is dispersed throughout the fibrous material. While a uniform dispersion is desirable, a non-uniform dispersion may also be used. If the TPC is soluble in a low-boiling solvent, the most convenient method of achieving the dispersion is to dissolve the TPC in the solvent, immerse the fibrous material in the solution, and evaporate the solvent. The process can be repeated to increase the loading of the TPC in the tape. Because it is necessary to avoid setting off the TPC the solvent should have a boiling point below about 60°C although vacuum evaporation could be used for higher-boiling solvents. Suitable solvents include methanol, methyl ethyl ketone, acetone, methylene chloride, benzene, chloroform, cyclohexane, hexane, etc. If the TPC is a grease, it can also be dissolved in a solvent or it can be rolled into the fibrous material. Typically, the amount of TPC in the tape is equal to about 50 to about 800% (all percentages herein are by weight) of the fiber weight. Preferably, the amount of TPC should be at least about 200% in order to avoid weak signals, but less than about 600% to avoid making the tape less flexible.

The impregnated tape is then coated with a flexible resin which protects the TPC from erosion by the gas stream, but which is permeable to the products of thermoparticulation which are detected by the monitor. Not all resins will be permeable and a new resin must be tested for permeability before being used. With that proviso, the resin may be an epoxy, polyester, acrylic, polyurethane, polybutadiene, or other resin. The preferred resin is an air-drying epoxy or polyester (alkyd) because it is easily applied to the fibrous material. The outer coating is generally about ½ to about 2 mils thick although thinner or thicker coatings may be used. About ½ to about 1 mil is the preferred thickness as it is thick enough to prevent erosion and thin enough to permit the escape of the thermoparticulation products. While the outer coating preferably surrounds all sides of the fibrous material as a continuous coating, it may be omitted on one side, the underside, if desired due to the presence of the adhesive on that side.

The tape is preferably made with an adhesive coating one one side so that the tape may be applied to various surfaces by simply pressing the tape against the surface. Suitable adhesives are well-known and include epoxies, urethanes, acrylics, and polyesters. The adhesive may be applied from solution. About 0.5 to about 3.0 mils thick is generally a suitable thickness for the adhesive.

The finished tape is then affixed to various positions in the generator which are exposed to the gas cooling stream. Upon overheating the tape emits particles which are detected by the monitor, which sounds an alarm or shuts down the machine. A sample of the particles can be collected and analyzed to determine whence they came. Since the tape chars and blisters, a visual inspection of the machine can also be made to determine which area overheated.

The following examples further illustrate this invention.

EXAMPLE

Weighed flexible Dacron felt pieces (1/16 × 1 × 3 inch) were immersed in a 50% solution of malonic acid in methanol. The pieces were placed in an oven at 60°C for 2 hours to evaporate the methanol. They were then re-weighed to determine how much malonic acid had been absorbed. The following table gives the results:

| Sample No. | Weight of Tape Before Treatment | Weight of Tape After Treatment | And Increase In Weight of Tape |
|---|---|---|---|
| 1 | 0.1850 | 1.3410 | 625 |
| 2 | 0.2390 | 1.6990 | 612 |
| 3 | 0.2170 | 1.7680 | 717 |
| 4 | 0.1970 | 1.3970 | 609 |
| 5 | 0.2570 | 1.7900 | 597 |
| 6 | — | — | Average Value = 632 |

The outside surfaces of the pieces were painted with 40 to 60% solutions in toluene of various resins, then placed in an oven overnight at 60°C to remove the solvent. The pieces were aged at 60° or 80°C for various periods. Each was then placed in a stainless steel boat and tested for thermoparticulation.

Accurate temperature measurements were made through a Chromel-Alumel thermocouple attached to the stainless steel boat which rested directly on a strip heater. The entire assembly was mounted on insulating stand-off pedestals within a stainless steel tube (1 inch o.d.). A phase controlled temperature regulator and programmer, connected through a sealed end-plate to the boat, acted as a temperature control on the heater. The output of the thermocouple and Condition Monitor Detector were monitored on a two-pen potentiostatic recorder. Hydrogen, at a constant flow rate of 7 liters/minute, was passed over the samples contained in the boat. A 5°C minute heating rate was maintained in each experiment. The "alarm" temperature at which considerable thermoparticulation occurred was taken from the recorder chart; this corresponded to a 50% decrease in the initial ion current of the Generator Condition Monitor (usually 0.8 to 0.4 mA). The temperature where thermoparticulation began was also noted (i.e., the "threshold" temperature). These two temperatures enabled a "thermoparticulation temperature range" to be recorded for each sample.

The following table summarizes the appearance and thermoparticulation characteristics of the various tapes.

| Sample No. | Tape Appearance | Overcoat Resin | Aging Conditions | Thermoparticulation Temperature Range (°C) | Change In Tape Appearance |
|---|---|---|---|---|---|
| 1 | flexible but powdery | None | 4 days at 60°C | 125 – 152 | white dark reddish brown spots |
| 2 | stiff | A cycloaliphatic epoxy sold by Union Carbide as "ERRA 4211" cured with 0.5% tetrabutyl tetanate | 4 days at 60°C | 197 | white darkened and bubbly |
| 3 | fairly flexible | A modified alkyd resin sold by Westinghouse Electric Corp. as "214-B" Varnish | 4 days at 60°C | 131 – 144 | yellow brown |
| 4 | very flexible | An oleoresinous varnish sold by Westinghouse Electric Corp. as "B-130" Varnish | 4 days at 60°C | 136 – 143 | light yellow brown |
| 5 | fairly flexible | A medium oil modified isophthalic acid polyester alkyd sold by Westinghouse Electric Corp. as "B-106" | 5 days at 60°C | 139 – 149 | lith yellow brown and puffy |

| Sample No. | Tape Appearance | Overcoat Resin | Aging Conditions | Thermoparticulation Temperature Range (°C) | Change In Tape Appearance |
|---|---|---|---|---|---|
| | | -continued | | | |
| 6 | stiff | Varnish A glycidyl ester sold by Celanese Corp. as "GLY-CEL C-295" | 16 days at 80°C | 152 – 162 | white white bubbly and foamy |

The tape sample with the catalyzed cycloaliphatic epoxy outer coating gave a high particulation temperature which indicates that the outer resin coating was cured to such an extent that thermoparticulation was suppressed (i.e., the particulates were "locked in" by the cured resin).

The changes in the tape appearance after thermoparticulation also were of considerable interest and could be readily used as a means of locating an overheating area in a turbine generator by visually inspecting the machine.

What we claim is:

1. A thermoparticulating tape comprising:
   a. a flexible fibrous material;
   b. a compound which thermoparticulates at a temperature below 200°C dispersed throughout said flexible, fibrous material; and
   c. a flexible outer coating over said flexible, fibrous material through which the products formed when said compound thermoparticulates can pass.

2. A tape according to claim 1 wherein said fibrous material is organic.

3. A tape according to claim 2 wherein said fibrous material is polyethylene terephthalate.

4. A tape according to claim 1 wherein said fibrous material is a mat.

5. A tape according to claim 1 wherein said fibrous material is ½ to 15 cm wide and 1 to 20 mils thick.

6. A tape according to claim 1 wherein said compound comprises 50 to 800% of said fibrous material.

7. A tape according to claim 6 wherein said compound comprises 200 to 600%.

8. A tape according to claim 1 wherein said compound is selected from the group consisting of malonic acid, derivatives of malonic acid, metal acetyl acetonates, blocked isocyanates, diazonium salts, and mixtures thereof.

9. A tape according to claim 8 wherein said compound is malonic acid.

10. A tape according to claim 1 which includes an adhesive coating on one side of said tape.

11. A tape according to claim 1 wherein said flexible outer coating is an epoxy or polyester (alkyd) resin.

12. A tape according to claim 1 wherein said outer coating is about ½ to about 2 mils thick.

13. A tape according to claim 1 wherein said compound which thermoparticulates is the only substance in said tape which thermoparticulates.

14. A method of making a thermoparticulating tape comprising:
   a. dispersing throughout a flexible fibrous material a compound which thermoparticulates at a temperature below 200°C; and
   b. applying a flexible outer coating over said flexible fibrous material through which the products formed when said compound thermoparticulates can pass.

15. A method according to claim 14 wherein said compound is dispersed by immersing said flexible fibrous material in a solution of said compound and evaporating the solvent from said solution.

16. A method according to claim 15 wherein said solution is 40 to 80% solids and said solvent has a boiling point below 60°C.

17. A method of protecting electrical apparatus from damage due to overheating and for thereafter determining the location of said overheating, said apparatus including a gas stream and a monitor for detecting particles in said gas stream and for emitting a signal when said particles are detected comprising applying a tape according to Claim 1 to said electrical apparatus at positions exposed to said gas stream.

18. A method according to claim 17 including the additional last step of inspecting said apparatus visually for blistered and darkened areas, after a signal has been emitted, to locate the area of overheating.

19. A method according to claim 17 including the additional last step of collecting a sample of said gas stream after a signal has been emitted and analyzing said sample.

20. A thermal detection system for electrical apparatus cooled by a gas stream, comprising a tape according to claim 1 on a portion of said electrical apparatus exposed to said gas stream and a monitor for detecting the presence of particles in said gas stream.

* * * * *